United States Patent Office 3,217,071
Patented Nov. 9, 1965

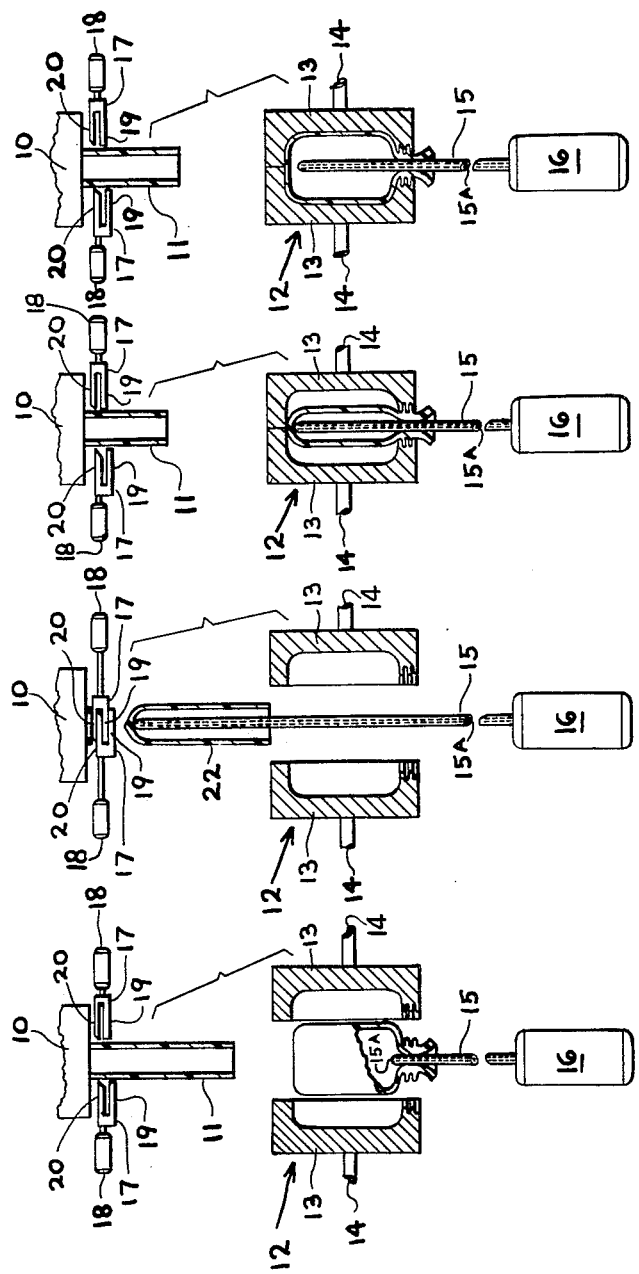

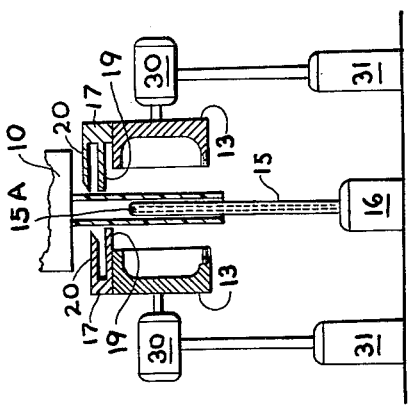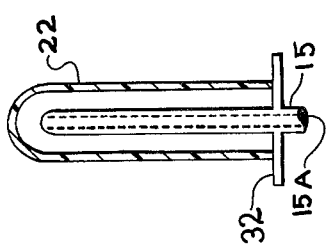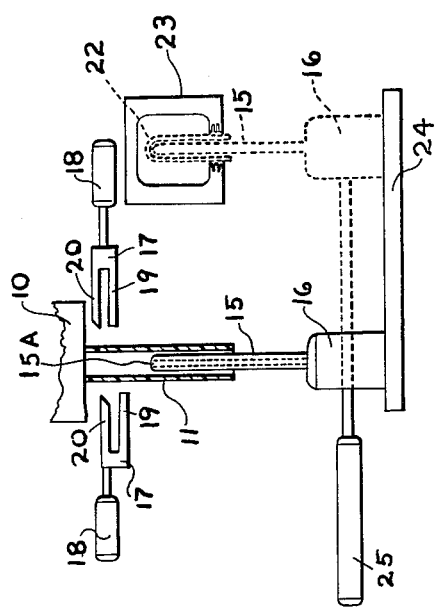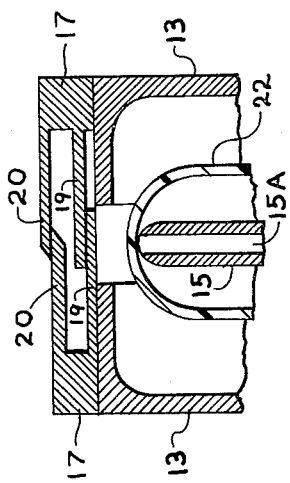

3,217,071
METHOD OF FORMING HOLLOW PLASTIC ARTICLES
Charles E. Plymale, Maumee, and Anthony J. Scalora, Toledo, Ohio, assignors to Owens-Illinois Glass Company, a corporation of Ohio
Filed Dec. 13, 1961, Ser. No. 159,087
3 Claims. (Cl. 264—98)

This invention relates to an improved method of forming hollow plastic articles and more particularly to a method of forming such articles without the necessity of a subsequent tail trimming operation.

According to certain methods of forming hollow plastic articles, heated thermoplastic material is extruded through an annular orifice in the form of tubing. This tubing is then placed between the open sections of a partible blow mold and then, upon closing of the mold, blown in the ensuing mold cavity to form a hollow article corresponding to the contour of the mold cavity. According to many of the known methods, at least one end of the tubing is sealed when the sections of the partible mold are moved together to form the mold cavity and thereby pinch the tubing. Such pinching of the tubing results in an article having a tail which must be trimmed in order to produce the finished article.

Accordingly, it is an object of this invention to provide a method of forming plastic articles in completed form with no subsequent tail trimming required.

Besides the presence of the objectionable tail resulting from the pinching of the tubing by the edges of the partible mold, another inherent difficulty results from such pinching in that there will be a concentration of plastic material in the wall or bottom along such pinched section. Such uneven distribution of material and the fact that the plastic material is clamped between the mold sections during the blowing operation and hence cannot be expanded, results in a non-uniform wall thickness of the bottom of the blown article.

Therefore, it is a further object of this invention to disclose a method of producing hollow plastic articles which will have relatively uniform wall thickness distribution along the bottom portion thereof.

Another problem in the production of hollow plastic articles from heated thermoplastic tubing has been how to position and support the tubing between the mold sections. This problem is especially significant when a continuous extrusion process is used, because in such case it is necessary to promptly move the length of plastic tubing to a remote position with respect to the extruder orifice in order to avoid interference between the oncoming extrusion and the severed length of tubing. According to most conventional methods the sections of a partible blow mold are positioned under the extrusion orifice fairly close to the point of extrusion. Heated thermoplastic tubing is then extruded between such open mold sections where it is grasped in some manner in order to support it therebetween. Such support may be rendered while the mold sections are either in the closed, partially closed, or open position. The mold sections, with the tubing thus supported, are then lowered or moved laterally to a position remote from the extrusion head where the rest of the blowing operation is completed. This of course, requires fairly expensive and complicated equipment for moving the mold sections and for supporting the tubing between such mold sections.

Accordingly, it is another object of this invention to provide a novel but inexpensive method of transporting a length of heated thermoplastic tubing to a partible blow mold and for supporting such length between the open halves of such blow mold.

A further object of this invention is to provide an improved method of producing hollow plastic articles by expanding a tubular parison in a blow mold wherein the parison is transported to the blow mold and no movement of the blow mold other than opening and closing thereof is required throughout the operation.

The specific nature of this invention as well as other objects and advantages thereof, will become apparent to those skilled in the art from the following detailed description taken in conjunction with the annexed sheets of drawings on which are illustrated several embodiments of this invention.

In the accompanying drawings:

FIG. 1 is an elevational schematic view partly in section of an apparatus for practicing the method of this invention showing a blown plastic article which is ready to be ejected from the open sections of a partible blow mold and showing the next length of thermoplastic tubing extending from the extrusion head.

FIG. 2 is a view similar to FIG. 1 showing the blow pipe raised into the lower open end of the tubing and showing the sealing knives in operative engagement to sever and seal such tubing to form a parison.

FIG. 3 is a view similar to FIG. 1, showing the next step of the operation wherein the parison, supported by the blow pipe, has been moved to a position between the sections of the partible mold and such sections have been closed around such tubing and also showing partial extrusion of the next length of tubing.

FIG. 4 is a view similar to FIG. 1, showing the next step wherein the parison has been expanded to conform to the mold cavity and showing further extrusion of the next length of tubing.

FIG. 5 is an elevational schematic view partly in section of a modification of the invention wherein the blow mold is positioned to one side of the extrusion head and the parison is shifted laterally from the axis of extrusion to said blow mold.

FIG. 6 is an elevation view partly in section of another modification wherein the sealing knives are attached to the respective mold sections and showing the mold sections open.

FIG. 7 is an enlarged fragmentary view of the modified apparatus of FIG. 6 showing the mold sections partially closed.

FIG. 8 is an elevational view of a modified blowpipe for supporting the parison.

In order to show one advantage of this invention it will be described in conjunction with the continuous type extrusion which requires less expensive equipment than the noncontinuous or intermittent type. However, it must be understood that this invention may be used equally well with intermittent extrusion of the tubular parison.

Referring to FIG. 1 there is shown an extrusion head 10 from which heated thermoplastic material issues continuously in the form of tubing 11. A blow mold generally designated 12, comprising mold sections or halves 13, is positioned under extrusion head 10 and located a substantial distance therefrom. The distance which mold sections 13 are positioned from extrusion head 10 depends on the rate of extrusion of tubing 11 and the time required for other phases of the operation. Thus, although the drawings show mold sections 13 more than a full mold length from the point of extrusion, they could, with the proper rate of extrusion and timing, be much closer, and could be very close to the point of extrusion if the intermittent type of extrusion were used. The location of the mold sections is noted in order to demonstrate another advantage of this invention which permits mold sections 13 to remain in the same vertical position throughout the operation, thus eliminating the need of expensive equipment for bodily shifting, here raising and lowering, the mold sections as is required in many of the prior art methods of blow molding. It should be expressly understood, however, that this invention will operate equally well whether or not the mold sections are capable of bodily movement relative to the extrusion head 10.

The apparatus normally employs fluid actuated cylinders (not shown) connected to pistons 14 which move mold sections 13 horizontally between an open and a closed position. A vertically retractable blowpipe 15, powered by fluid pressure cylinder 16, is provided which is capable of entering the lower open end of tubing 11. Fluid cylinder 16 is capable of raising blowpipe 15 to a height sufficient to engage the lower open end of tubing 11 as it is extruded from extrusion head 10. The blowpipe 15 also permits the entrance of air under pressure through channel 15a to expand the heated thermoplastic in the mold cavity of blow mold 12.

A pair of coacting sealing knives 17, which serve to simultaneously sever a length from the parent body of tubing 11 and seal one end of such length to form a parison 22 (FIG. 2), are positioned under extrusion head 10 near the point of extrusion. Knives 17 comprise lower blades 19 and upper blades 20. The leading edges of the respective lower blades 19 are dulled so that their operation results in sealing the tubing to form parison 22. The leading edges of the respective upper blades 20 are sharpened so that their operation results in cleanly severing tubing 11 to leave the lower end thereof open, thereby permitting insertion of blowpipe 15. Movement of the respective sealing knives 17 is powered by horizontally disposed fluid pressure cylinders 18. The leading edges of the respective blades may be either straight or curved as preferred with the shape of the lower blade 19 depending on the type of seal desired. Thus, if the leading edges of the lower blades 19 are straight, a flat seal will be produced, while if the leading edges are curved, the operation of the blades 19 will radially constrict all wall portions of the tubing 11 to produce a puckered seal. If desired, the lower blades 19 and the upper blades 20 could be separately actuated by separate hydraulic cylinders.

In the operation of this invention, heated thermoplastic material is extruded from extrusion head 10 in the form of tubing 11. At some point during such extrusion, blowpipe 15 is raised by fluid cylinder 16 so that its upper end enters the lower open end of tubing 11. Blowpipe 15 is raised to a height somewhat lower than sealing knives 17 so as not to interfere with the operation of said knives. After the required length of tubing 11 has been extruded, fluid cylinders 18 are actuated to project the respective lower blades 19 and upper blades 20 into operative engagement to simultaneously seal and sever such length of tubing 11 from the parent body of thermoplastic material. Any thermoplastic material which may have become entrapped between the lower and upper blades during the sealing and severing operation is blown away by a blast of air upon the retraction of knives 17 by fluid cylinders 18.

As previously noted, the operation of knives 17 seals the upper end of the severed length of tubing 11 to form parison 22 while leaving the lower end of the parent tubing open (FIG. 2). Upon severing, parison 22 falls until its sealed end contacts the upper end of blow pipe 15, thereby depending on said blowpipe for support. Next, fluid cylinder 16 retracts blowpipe 15 so as to position parison 22 between the open mold sections 13. Such retraction lowers parison 22 sufficiently that the top sealed end thereof is lower than the upper surface of the blow mold cavity. Thus, in addition to supporting parison 22, blowpipe 15 also serves as a transfer element for said parison. With the parison 22 thus positioned, mold sections 13 are closed around such tubing without pinching the sealed end (FIG. 3) and the parison is expanded by fluid pressure introduced through channel 15a of blowpipe 15 to the configuration defined by the mold cavity (FIG. 4). During the operation the next length of tubing is continuously being extruded. After cooling and setting of the expanded thermoplastic material, the mold sections 13 are opened, the tail free hollow article formed therein is removed, and the blowpipe 15 is raised to engage the next length of tubing 11.

Referring now to FIG. 5, there is shown a modification wherein the mold sections 23 are positioned to one side of the extrusion head 10 rather than directly under extrusion head 10 as in the previous example. Thus, it is necessary to move the parison 22 laterally from the axis of extrusion to mold sections 23. To accomplish this, there is provided a horizontally disposed fluid pressure cylinder 25 which is secured to fluid pressure cylinder 16. Cylinder 25 powers the lateral movement of cylinder 16 and blowpipe 15 from the position under extrusion head 10, where parison 22 is engaged by said blowpipe, to mold sections 23. A base member 24 is provided to support and guide the lateral movement of cylinder 16.

The operation of this embodiment is similar to that previously described through the step of sealing and severing tubing 11 to form parison 22. Upon such sealing and severing, fluid pressure cylinder 25 is actuated to move cylinder 16 and blowpipe 15, with parison 22 supported thereon, laterally from the axis of extrusion to mold sections 23 which are then closed around parison 22. Parison 22 is then expanded to form the hollow article. After such expansion the hollow article is removed and the blowpipe returned to receive the next length of tubing.

There is shown in FIGS. 6 and 7 another embodiment of the sealing and severing apparatus wherein knives 17 are mounted on mold sections 13. In this embodiment the knives 17 operate upon the partial closing of mold sections 13. To prevent interference with the oncoming tubing when the continuous extrusion process is used, it is necessary that mold sections 13 be capable of vertical as well as horizontal movement. To accomplish this, there is provided horizontally disposed fluid pressure cylinders 30 which power the opening and closing of mold sections 13. Horizontally disposed fluid pressure cylinders 30 are supported by vertically disposed fluid pressure cylinders 31 which serve to raise and lower cylinders 30 and mold sections 13.

In the operation of this embodiment, tubing 11 is extruded from extrusion head 10. During such extrusion blowpipe 15 is raised by fluid pressure cylinder 16 to enter the lower open end of tubing 11. After the proper length of tubing has been extruded, fluid cylinders 30 are actuated to partially close mold sections 13. Such partial closing is enough to project the leading edges of the respective upper blades 20 and lower blades 19 of knives 17 past each other, thereby severing and sealing such length of tubing 11 to form parison 22 (FIG. 7). The parison 22 thus formed falls over blowpipe 15 and depends thereon for support. Cylinder 16 is then actuated to lower blow nozzle 15 and parison 22. Cylinders 31 are also actuated to lower the mold sections 13 away from extrusion head 10. Naturally, such lowering of the mold sections 13 and the parison 22 is not required when the intermittent extrusion process is used. The lowering of mold sections 13 and parison 22 is so controlled that the sealed end of parison 22 is lower than the upper surface of the molding cavity of mold sections 13 in order to permit mold sections 13 to close around parison 22 without pinching the sealed end thereof. Upon lowering, the mold sections 13 are closed around parison 22 and said parison is expanded to the configuration defined by the mold cavity as in the previous example. After cooling and setting of the thermoplastic material, the mold sections 13 are opened, the tail free hollow article formed therein is removed, and the apparatus returned to receive the next length of tubing.

There is shown in FIG. 8 another embodiment of the blowpipe wherein the parison 22 is supported on its lower end rather than by having its sealed end resting on the top of blowpipe 15. In this embodiment, blowpipe 15 is provided with a radially projecting flange 32 of sufficient width to extend past the outer periphery of parison 22. Said flange 32 is located a substantial distance from the end of blowpipe 15. While such distance is not critical, it obviously must be less than the length of parison 22 or the sealed end will contact the top of blowpipe 15. If desired, a small amount of fluid pressure may be maintained through channel 15a to assist in supporting parison 22 and to reduce the tendency of parison 22 to lean against the top of blowpipe 15. Use of this modification permits blowpipe 15 to support tubing having both ends open as well as tubing having one end sealed. If tubing having both ends open is used, the sealing which is required in order to expand the same in the blow mold cavity may be accomplished by pinching the upper end of such tubing between the upper mating faces of the mold sections rather than by use of the sealing knives as in the previous embodiments.

From the foregoing description it will be clearly apparent to those skilled in the art that this invention provides not only for producing hollow plastic articles with greater efficiency than has heretofore been possible, but also for producing such articles free from objectionable tails which, according to the prior art procedures, have required trimming by a separate operation. Although the drawings show the invention in conjunction with the production of containers, it is quite obvious that it could be used for a wide variety of hollow articles. Furthermore, it should be understood that various details of construction may be modified through a wide range without departing from the principles of this invention, and it is, therefore, not the purpose to limit the patent granted hereon otherwise than necessitated by the scope of the appended claims.

In the appended claims the term "substantially continuously extruding" should be understood as applying to either an extruder which continuously supplies tubing or to one which supplies tubing intermittently, as one equipped with an accumulator.

We claim:
1. The method of forming hollow plastic articles comprising the steps of supplying tubing of thermoplastic material, said tubing having an open end and being heated to a condition of plasticity to permit expansion, positioning the open halves of a partible blow mold around said tubing, said blow mold having tube sealing and severing means attached thereto, inserting a blowpipe into the lower open end of said tubing, sealing and severing said tubing beyond the end of the blowpipe by partially closing said mold halves, supporting the sealed and severed length of tubing by means of said blowpipe, fully closing said mold halves around said tubing without pinching the sealed end thereof, and expanding said tubing in said mold by introducing fluid under pressure through said blowpipe.

2. The method of forming hollow plastic articles comprising the steps of continuously extruding heated thermoplastic material downwardly from an orifice in the form of tubing, positioning the open halves of a partible blow mold around said tubing, said blow mold having tube severing and sealing means attached thereto, inserting a blowpipe into the lower open end of said tubing, sealing and severing said tubing beyond the end of the blowpipe by partially closing said mold halves, supporting the sealed and severed length of tubing on said blowpipe, moving said blowpipe and said blow mold to a remote position relative to the extruder orifice, fully closing said mold halves around said tubing without pinching the sealed end thereof, and expanding said tubing in said mold by introducing fluid under pressure through said blowpipe.

3. The method of forming hollow plastic articles comprising the steps of continuously extruding tubing of thermoplastic material downwardly, said tubing having its free end open and being heated to a condition of plasticity to permit expansion and setting, inserting a blowpipe into the lower open end of said tubing, said blowpipe being substantially smaller than the inside of said tubing, sealing said tubing at a point beyond the inserted end of said blowpipe to form a parison, severing said tubing at a point beyond said seal in such manner as to leave the lower end of the parent tubing open, depositing said sealed and severed parison on said blowpipe, said blowpipe supporting said tubing, transferring said blow pipe with said parison supported thereon to a position between the open halves of a partible blow mold at which said mold halves may close without pinching the seal of said parison, closing said mold halves around said parison without pinching said seal, and expanding said parison in said mold by introducing fluid under pressure through said blowpipe.

References Cited by the Examiner
UNITED STATES PATENTS

| | | | |
|---|---|---|---|
| 2,787,023 | 4/57 | Hagen et al. | 264—98 |
| 2,810,934 | 10/57 | Bailey | 264—98 |
| 2,819,490 | 1/58 | Froot | 18—20 |
| 2,935,764 | 5/60 | Mason | 18—55 |
| 3,001,239 | 9/61 | Santelli | 264—98 |
| 3,008,191 | 11/61 | Park | 18—55 |
| 3,011,216 | 12/61 | Gussoni | 264—97 |
| 3,017,314 | 1/62 | Kebekus et al. | 156—498 |
| 3,028,294 | 4/62 | Histed | 156—515 |

ROBERT F. WHITE, *Primary Examiner.*

MICHAEL V. BRINDISI, ALEXANDER H. BRODMERKEL, *Examiners.*